May 16, 1967 W. E. HOWALD 3,319,930
STATOR ASSEMBLY FOR TURBOMACHINES
Filed Dec. 19, 1961 2 Sheets-Sheet 1
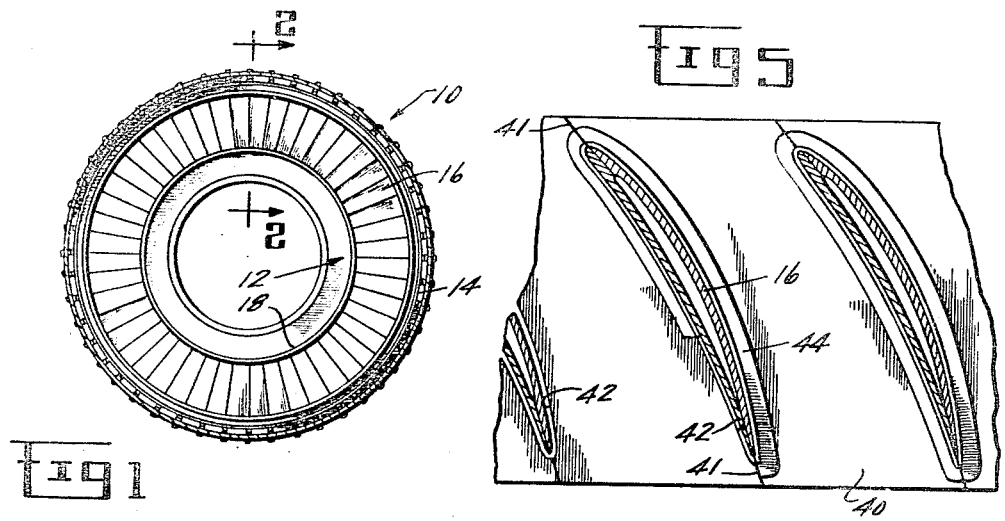
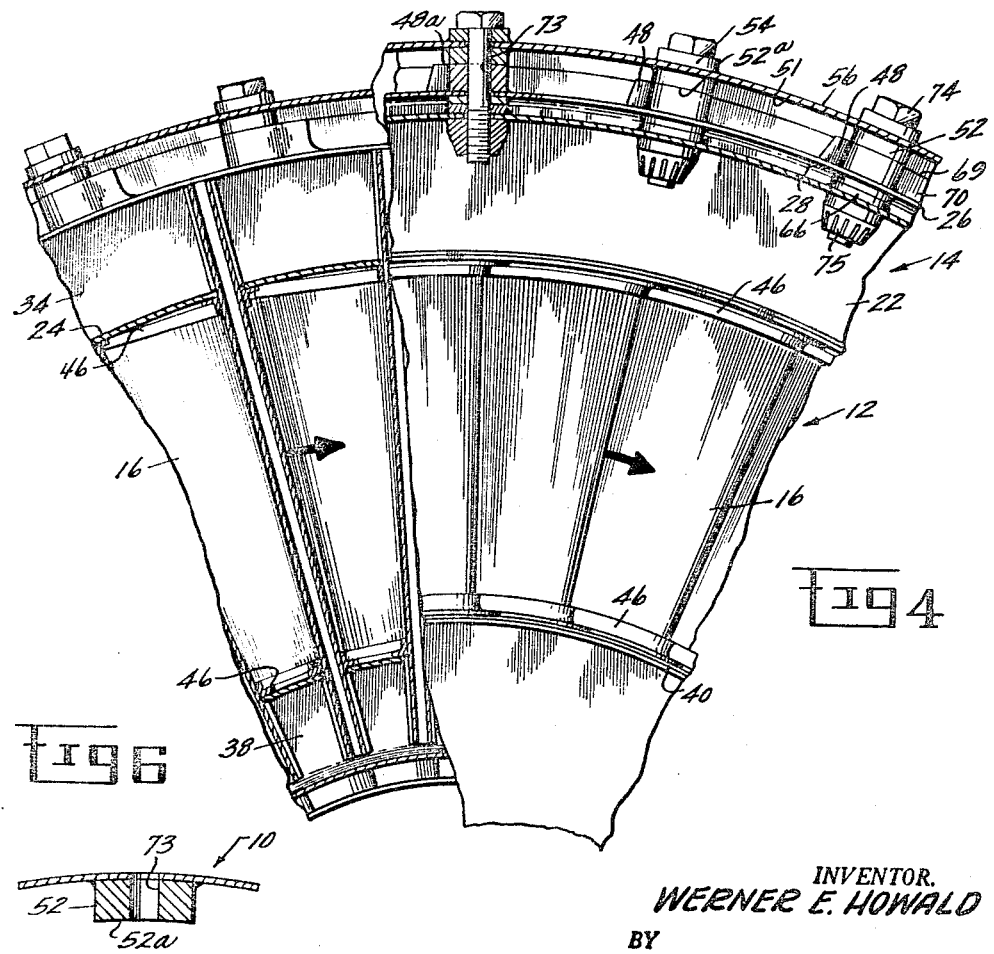
INVENTOR.
WERNER E. HOWALD
BY
Harry C. Burgess
ATTORNEY

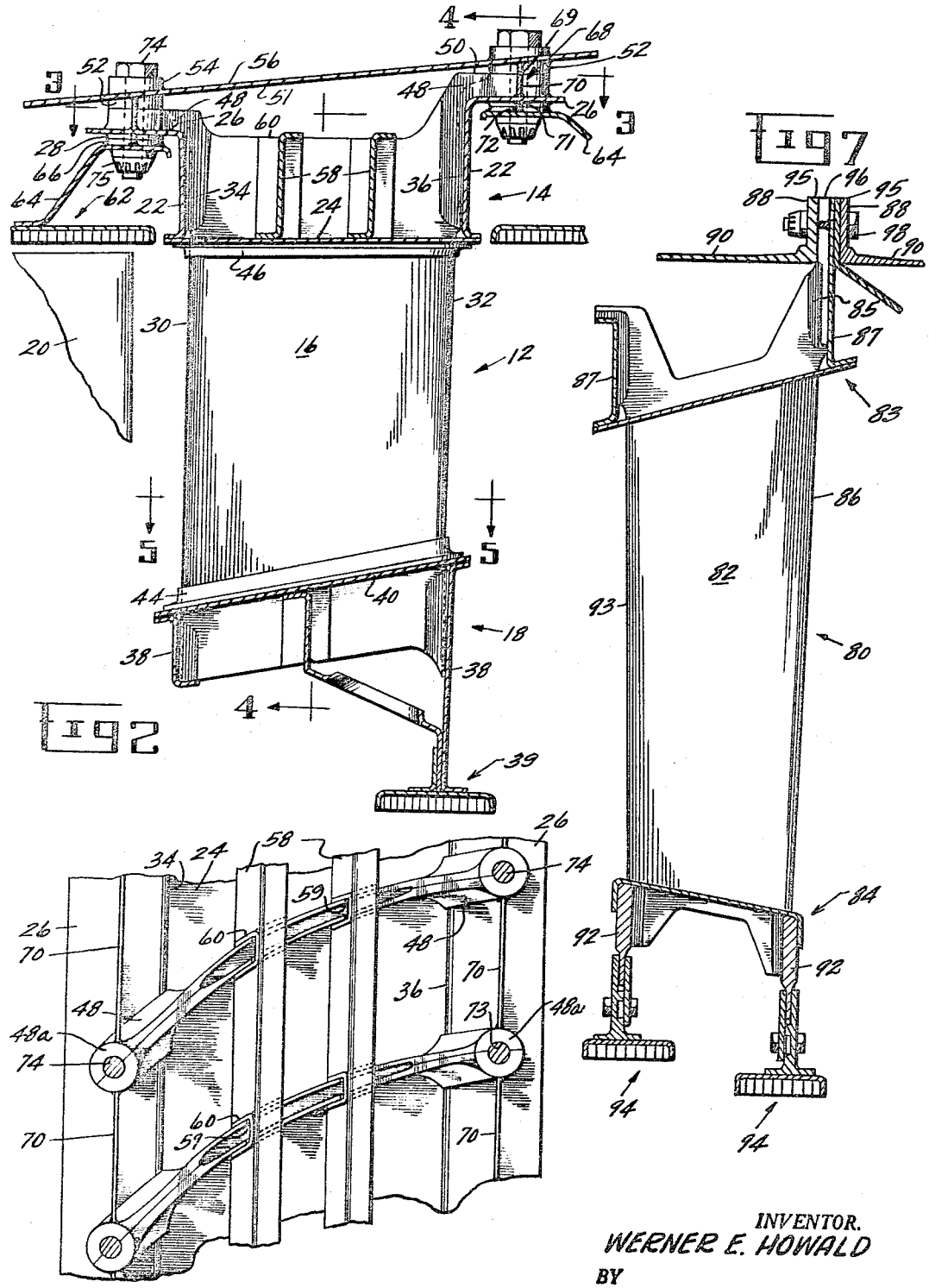

United States Patent Office 3,319,930
Patented May 16, 1967

3,319,930
STATOR ASSEMBLY FOR TURBOMACHINES
Werner Ernst Howald, Cincinnati, Ohio, assignor to General Electric Company, a corporation of New York
Filed Dec. 19, 1961, Ser. No. 160,669
8 Claims. (Cl. 253—78)

This invention relates to turbomachines, and, more particularly, to means for constructing a lightweight, sheet-metal type stator casing for use in compressors or turbines of such machines.

In airborne turbomachines, such as aircraft gas turbine jet engines, it is essential that the weight of the engine be kept at a minimum. As aircraft are designed for higher flight speeds at greater altitudes, increases in the size of the engine inlet area, and, thus, the engine overall diameter, have become necessary. A corollary to increasing the engine diameter has been the need for increasing the strength of the outer housing or casing structures, such as the compressor stator housing. One means for increasing the strength has been to make the casings from heavier castings, castings (or forgings) being widely used because of their inherent strength and rigidity which enables them to resist the wide range of temperatures and stresses encountered in aircraft engine applications. However, if a casting, or forging, is used, the housings will usually be much heavier than would be required by strength considerations alone because of the minimum thickness of the metal required by the casting, or forging, process. It has, therefore, been recently suggested that stator casings, among other parts of the engine, be made of thin-walled, sheet-metal components which, with proper design, will not only provide strong, lightweight parts but also will assure the required rigidity of the turbomachine components.

However, the known methods of constructing lightweight, sheet-metal stator casings have left something to be desired. Specifically, they have required relatively complex structures in order to supply the necessary rigidity and dimensioning to the light, sheet-metal outer housing, or shell member. For example, some of the prior art means have utilized pluralities of rings located within rings with one or more cross members added to brace the rings one against the other. Further problems which have been experienced by designers of lightweight, sheet-metal components for aircraft jet engines have included the need to compensate for the increased stresses induced by the use of the more flexible metal parts. One of these problems has concerned the method of attaching the stator vanes of an axial-flow compressor to the vane supporting structure, which, in turn, is attached to the outer housing, or casing shell. Another problem has been concerned with ways and means for holding the diameter of the outer casing within required limits, yet have the various parts which go to make up the entire compressor structure fit readily together. Finally, it has usually been necessary to provide a multiplicity of weldments or braze joints between the many parts in the prior art sheet metal structures which has created problems in structural rigidity and reliability.

Accordingly, a general object of the present invention is to provide a lightweight, turbomachine stator casing structure utilizing minimum weight thin-walled, sheet-metal components which provide the casing with high rigidity while, at the same time, assure control of critical dimensions. It is another object of the invention to provide a lightweight, sheet-metal turbomachine stator casing assembly having fewer structural parts with increased strength and rigidity while, at the same time, assuring control of critical dimensions in a flexible, sheet-metal outer casing shell. A still further object of the present invention is to provide in a lightweight, sheet-metal turbomachine compressor or turbine assembly means whereby stresses induced in the stator vanes and vane supporting structure are reduced.

Briefly, a preferred embodiment of the invention comprises a compressor stator assembly including a thin-walled, sheet-metal outer member and an inner bulkhead member, the bulkhead member having inner and outer ring members and a plurality of radially-extending stator vanes extending therethrough, the vane leading and trailing edges having means whereby the vanes are rigidly affixed to the rings, and a plurality of pairs of discrete locating surfaces on the inner bulkhead member and on the outer sheet-metal member, one surface of each pair being on each member, the outer and inner members being rigidly fastened together at the locating surfaces, when in juxtaposition, by an improved method of assembly, whereby the inner bulkhead member provides rigidity and critical dimensioning for the thin, sheet-metal outer member.

The features of the invention which are believed to be novel are set forth in the appended claims. The invention itself, however, both as to its organization and details, together with further objects and advantages thereof, will be more readily understood upon reading of the following description in conjunction with the drawings in which:

FIGUURE 1 is an axial view of a turbomachine compressor utilizing the present invention;

FIGURE 2 is an enlarged cross sectional view taken along line 2—2 of FIGURE 1;

FIGURE 3 is a plan view taken along line 3—3 of FIGURE 2;

FIGURE 4 is a cross sectional view, partially broken away, taken along line 4—4 of FIGURE 2;

FIGURE 5 is a plan view, partially in cross section, taken along line 5—5 of FIGURE 2;

FIGURE 6 is a cross sectional view of a casing locating surface; and

FIGURE 7 is a side view of a further embodiment of the invention.

Referring now to the drawings, FIGURE 1 is an axial view of a compressor stator casing assembly. Indicated generally by numeral 10, in FIGURE 1, is an outer sheet-metal shell or casing member. Indicated generally at 12 is an inner bulkhead member comprising an outer stator ring 14, a plurality of radially-extending stator vanes 16, and an inner stator ring 18. The compressor stator casing is shown as comprising an integral cylindrical structure, however, it is understood that in a preferred embodiment the structure will be split along a horizontal center line into two 180° sections. Referring now to FIGURE 2, it will be seen that the outer stator casing is a relatively thin, and flexible, sheet-metal member supported from within by the inner stator vane and ring assembly, or bulkhead member 12, including the outer ring, indicated at 14, the vanes 16, and the inner ring, indicated at 18. The stator vane and ring assembly alternates with rows of compressor rotor blades, one of which blades is indicated at 20, in a multistage axial-flow compressor application. Although a compressor is used for purposes of illustration it should be realized that the invention is equally useful in the construction of lightweight turbine stator casing assemblies.

One of the primary features of the invention concerns the manner in which the thin-walled, sheet-metal outer casing member is dimensioned and provided with the required rigidity and support. It will be noted that the outer stator ring 14 is channel-shaped in cross section having two side portions 22—22 extending upwardly, or outwardly, from a connecting bottom portion 24. The side portions are generally L-shaped, with the longer portion of the inverted L forming the sides of the channel and each shorter leg forming a cylindrical flange 26. The flanges 26—26 extend outwardly of the channel-shaped stator ring 14 and carry a plurality of locating surfaces, or pads 28 in the inner, or under sides thereof.

As stated above, one of the problems connected with known lightweight, sheet-metal type compressor or turbine stator designs has been the tendency for the stator vanes to disengage or be torn away from light, sheet-metal mounting or support structures due to the stress of high temperature and high flight speed operation. It will be noted that the outer end of the stator vane 16 in FIGURE 2 projects through the connecting bottom portion 24 of the outer channel-shaped stator ring 14. Thus, a feature of the present invention is the provision whereby the leading and trailing edges 30 and 32, respectively, of the stator vanes 16 are rigidly secured to the outer stator ring, along the inner surfaces of the side portions thereof at 34 and 36, each connection being a single weldment, or brazed joint extending the depth of the channel-shaped ring. Likewise, at the radially inner end of the stator vanes the stator ring 18 may consist of a pair of inwardly-extending side portions 38—38 and a connecting top, or outer portion 40. The inner ends of the stator vanes project through the top portion of the ring, with the leading and trailing edges being rigidly secured, by welding or brazing, to the inner surfaces of the side portions 38—38 along the lengths thereof. One of the side portions 38 of the inner ring may be extended to provide a support for a rotor sealing member, such as is indicated at 39, or a rotor bearing means, if desired. Thus, in comparison to the known lightweight compressor constructions, wherein the stator vanes are usually secured at one point (or perhaps two longitudinally separated points) on the vane circumference to the vane supporting structure, the present invention features a rigidized assembly, including the outer and inner rings and the stator vanes, which assembly features a stator vane-to-ring attachment adapted to reduce the effect of the stress concentration normally present at the joint between the vane and its supporting structure.

For ease of assembly the connecting portions 24 and 40 of the outer and inner stator rings, respectively, may consist of axially-split segments, as best shown in FIGURE 5. In this embodiment, the top portion 40 of the inner ring 18, shown for purposes of illustration, is split at 41 at each vane location. The split line is then cut out at 42 in the general airfoil shape of the stator vane 16. To firmly secure the vane to the ring portion 40 a collar, or shoe 44 may be utilized, the collar, or shoe also being split to facilitate assembly. Thus, with the vanes 16 positioned in the cutouts 42 and the collar halves in abutment, the parts are permanently attached, either by welding or brazing, to form a rigid, airtight fit. Although utilized in the described embodiment, it will be understood that use of the collars is not essential as the vanes could simply pierce the ring and be welded, or brazed directly thereto.

It will be seen from the drawings that the outer ends of the leading and trailing edges of the stator vanes are provided with prolongations 48—48, each prolongation being adapted to overlie or otherwise closely abut a portion of the outer stator ring. In the embodiment of FIGURES 2 and 3 the prolongations overlie the cylindrical flanges 26—26 and are permanently secured thereto. The outer, or upper, surfaces of the vane edge prolongations comprise a plurality of discrete locating and supporting surfaces 48a. Likewise, the inner surface 51 of the outer casing member 14, is also provided with a plurality of pads 52 having similar locating surfaces 52a. Each surface 48a on the ring and vane, or bulkhead assembly is adapted to abut a pad surface 52a on the casing, the abutting pads thus comprising pairs of locating, and supporting, surfaces on the inner and outer members, respectively. The pads, or locating surfaces 52a may be formed from substantially circular metal buttons, or disks permanently welded or brazed to the supporting surfaces. Additional supporting surfaces, or pads 54 may be permanently attached to the outer surface 56 of the sheet metal casing. Thus, when in juxtaposition, the surfaces inside the casing, or shell member, and those on the outer and inner surfaces on the shell member 12 itself, form axially and radially aligned rows of locating surfaces. FIGURE 3 perhaps better illustrates the surfaces 48a and the fact that the vane leading and trailing edge prolongations 48—48 are preferably in the form of small castings permanently affixed to the vanes 16. FIGURE 3 also indicates that stiffening means in the form of a plurality of Z-shaped rings 58—58, inserted in sawcuts 59—59 in the outer ends of the hollow stator vanes, may be utilized, although they are not absolutely necessary. If used, the rings are welded or brazed to the outer surface of the ring bottom portion and to the vanes, thus providing additional rigidity for the inner bulkhead assembly. Clips 60 may also be provided as aids in positioning and holding the rings 58—58 in the sawcuts. The stator vanes in the embodiment shown in the drawings are preferably hollow, although they need not necessarily be so, for the purpose of weight saving. Additionally, when hollow, the vanes may be utilized to conduct cooling air, service air, and/or engine bleed air, in a known manner.

As stated above, when the described construction is utilized in a multistage compressor there will be a rotor stage, or blade row alternating with each stator stage, or row of vanes 16. To insure a continuous flow path through the compressor, means must be provided adjacent the tips of the row of rotor blades 20 to insure a substantially airtight channel. In the embodiment shown, a plurality of shrouds, one of which is indicated at 62, are provided which are supported in the correct position adjacent the outer stator ring 14 and axially in line with the bottom, or connecting portion 24 thereof, by a mounting flange 64. The flange may have a plurality of discrete locating surfaces, or pads 66 attached thereto. These pads are adapted to mate with and abut the discrete locating pads 28 on the inner surfaces of the flanges 26 of the outer stator ring to assure the correct radial placement of the shroud. The rotor shroud means is assembled with the bulkhead member, as described hereinbelow.

Further sealing means, indicated generally at 68, are provided to assure that the flow of the compressed air through the machine is continuously towards an area of higher pressure, i.e., downstream. This latter sealing means includes a sealing strip 69 attached to the inner surface 51 of the casing member 14, the strip extending circumferentially between the pads 52. A similar abutting strip 70 is affixed to the upper surface of each flange 26. Likewise, abutting sealing strips 71 and 72, respectively, are affixed to the under surface of each flange 26 and to the mounting flange 64. The pairs of abutting sealing strips act to prevent backflow from the region of higher pressure downstream of the stator vane and ring assembly 12 (to the right in FIGURE 2) to the region of lower pressure upstream thereof (to the left in FIGURE 2).

It will be apparent from the above description that the inner and outer stator ring and vane assembly, indicated generally at 12, may be termed a bulkhead, or support member for the thin-walled outer casing, or shell member. In contrast to known arrangements for constructing compressor casings wherein the stator vanes have solely an aerodynamic purpose, the vanes 16 and the channel-shaped inner and outer stator rings 12, in assembly, provide supporting structure sufficient to rigidize a thin-walled, flexible, sheet-metal outer casing shell. Further, in accordance with still another feature of the invention the inner bulkhead assemblies 12 provide critical dimensioning, as well as rigidity, for a sheet-metal type compressor, or turbine, stator casing. The invention thus comprehends a novel method of constructing a lightweight compressor, or turbine, stator casing from a substantially cylindrical sheet-metal outer member and an inner support, or bulkhead member. The method includes the steps of, first, providing pairs of locating and supporting surfaces, one surface of each pair being on the inside of the outer member, or stator casing 14, and the other surface of the pair being on the outermost part of the inner bulkhead member 12, or stator vane and ring assembly. In the described embodiment, these surfaces 52a and 48a are on the pads 52 and the prolongations 48, respectively. The pads 52 may be formed by brazing, or welding metal buttons or disks on the outer casing member, the surfaces on the bulkhead member being the outermost portion of the prolongation casting 48. Next, the casing is placed in a fixture and the surfaces 52a of the outer member locating pads 52 machined to a single diameter. As seen in FIGURE 6, the surfaces 52a of the pad 52 will then have an arcuate configuration, in cross section. Next, the outer surface of the pair of locating surfaces, i.e., the surfaces 48a on the leading and trailing edge prolongations, is similarly machined to a single diameter such as to enable the inner stator vane and ring assembly, or bulkhead to be located within the outer casing, or shell with the pairs of locating surfaces 52a and 48a in juxtaposition. Finally, the assembly is completed by securing the inner bulkhead assembly to the outer casing shell at the points of abutment of the row of paired locating surfaces by boring, or otherwise providing a hole 73 through the aligned locating surfaces, inserting bolts 74 through the holes and securing the bolts with nuts 75. Obviously, suitable means for attaching the parts described may also consist of rivets or spot welds, within the scope of the invention. Note that the rotor shroud mounting flange may also be secured by the bolt 74 and the nut 75, in one operation, the nut preferably being permanently attached to the shroud flange prior to final assembly. With the bulkhead 12 rigidly secured to the outer casing at the paired locating surfaces, it will be readily apparent that through close control of the dimensions of the inner diameter of the casing pads 52 on the outer member and the outer diameter of the locating surfaces on the inner member, or bulkhead, that the compressor casing structure is given extreme rigidity, while maintaining circularity and dimensioning, with a minimum of machining and welding operations. Further, with use of channel-shaped inner and outer rings rigidly secured to stator vane leading and trailing edges along the entire depth of each ring, a rigid structure adapted to withstand the high stresses imposed upon the rows of stator vanes by operation at high temperatures and high flight speeds is provided. In comparison, known lightweight casing structures suffer from extreme stresses at the vane-to ring connections induced by lack of the equivalent of the latter feature, which has often caused such structures to fail because of vanes tearing free from the mounting structure. Also, by providing, in addition to the constituent parts of the stator rings being attached to the vanes along their entire abutting surfaces, that the vanes themselves are attached—with the rings—directly to the casing, the arrangement of the present invention assures that stresses imposed on the vanes are transmitted directly from the vanes to the casing, through the vane edge prolongations, and not from the vanes to the vane supporting structure (i.e., rings or channel members) and thence to the outer shell, as has been the previous practice. Thus, with the vanes (and rings) connected directly to the outer casing and with a rigid ring and vane, or bulkhead structure inside the casing, the invention features an improved stator casing construction whereby all the parts of the assembly, including the thin-walled, flexible outer casing or shell member, even though of lightweight sheet-metal, act in concert to provide an extremely rigid, critically dimensioned, strong turbomachine casing structure. With use of the invention it has been found that the outer shell can be made as little as 0.020 inch, or less, in thickness, which is a significant advance in the state of the art of lightweight compressor and/or turbine casing manufacture.

FIGURE 7 illustrates an alternate embodiment of the invention wherein an inner bulkhead member 80 may include a plurality of stator vanes, one of which is indicated at 82, an outer channel-shaped stator ring 83, and an inner channel-shaped stator ring 84. In this embodiment, the stator bulkheads are located and supported on the outer casing by means of a single vane edge prolongation which may take the form of a casting 85. The casting and the vane trailing edge 86, in this embodiment, are securely fastened, by brazing or welding, to the inner surface of a side portion 87 of the outer stator ring. The prolongation, or casting and the side portion 87 project radially outward of the compressor stator being located between a pair of flanges 88—88 welded to a sheet-metal outer casing 90. At the inner end of the stator vane and ring assembly there may be provided a pair of cast, or forged annular rings 92—92, to which are brazed, or welded prolongations of the leading and trailing edges 93 and 86, respectively, and which give rigidity to the inner end of the stator ring and vane assembly and serve as supports for a rotor bearing, or the stationary sealing means indicated at 94—94. The structure just described, will also provide rigidity and roundness to a thin-walled, sheet-metal stator casing in a similar manner as in the previously described embodiment. Control of inner and outer diameter dimensions when manufacturing and assembling the casing according to this embodiment may be achieved in a number of ways, e.g., by control of the dimension of the outer diameter of the flanges 88—88, i.e., the surfaces 95—95, and the outer diameter 96 of the vane prolongation 85. When the surfaces 95—95 and 96 are aligned and axial holes drilled therein for receipt of suitable fastening means 98, desired dimensions will be achieved, as previously described.

While I have described the invention in detail, it will be obvious to those skilled in the art that various changes and modifications may be made in the embodiments thereof without departing from the spirit or scope of the invention.

The appended claims which are intended to cover all such modifications and variations, are as follows:

1. In an axial-flow turbomachine having a thin-walled, sheet-metal outer casing and at least one rotor stage, a stator assembly comprising:

an outer stator ring channel-shaped in cross-section and including radially outwardly-extending side portions and a connecting bottom portion;

a plurality of radially-extending stator vanes having leading and trailing edges with integral prolongations thereof, the outer ends of said vanes piercing the bottom portion of said outer stator ring, said leading and trailing edges being rigidly affixed to the side portions of the ring co-extensively of the radial lengths thereof;

a plurality of discrete locating surfaces on outer portions of the prolongations of at least one of said edges;

discrete locating and supporting means on said casing; and fastening means extending through the casing locating and supporting means, at least one of said stator ring side portions, and said prolongation locating surfaces for rigid interconnection thereof;

and an inner channel-shaped stator ring having radially inwardly-directed side portions and a connecting top portion, the inner ends of said stator vanes piercing said top portion, said leading and trailing edges being rigidly affixed to the inner stator ring side portions co-extensively of the radial lengths thereof, the stator ring and vane assembly providing rigidity and roundness for the thin-walled, sheet-metal outer casing.

2. In an axial-flow turbomachine having a thin-walled, sheet-metal outer casing and at least one rotor stage:

an outer stator ring channel-shaped in cross-section and comprising a bottom portion and a pair of side portions extending radially from the upper surface thereof;

a plurality of radially-extending stator vanes having leading and trailing edges integral with prolongations thereof, the outer ends of said vanes piercing the bottom portion of said outer stator ring when assembled therewith, said leading and trailing edges being rigidly affixed to the side portions of the ring co-extensively of the radial lengths thereof;

a plurality of discrete locating surfaces on the outer stator ring and vane assembly;

a plurality of locating surfaces on the casing, said surfaces comprising at least two rows of circumferentially-spaced discrete pads, the surfaces of each row of pads being arranged on a single diameter, the discrete locating surfaces of said outer stator ring and vane assembly abutting said casing pads;

fastening means extending through and rigidly interconnecting the discrete casing pads, the outer stator ring and vane assembly locating surfaces, and vane edge prolongations;

and an inner channel-shaped stator ring having radially inwardly-directed side portions and a connecting top portion, the inner ends of said stator vanes piercing said top portion when assembled therewith, said leading and trailing edges being rigidly affixed to the inner stator ring side portions co-extensively of the radial lengths thereof, the stator rings and vanes providing rigidity and roundness for the thin-walled, sheet-metal outer casing.

3. In combination with an axial-flow turbomachine having a thin-walled, sheet-metal outer casing and at least one rotor stage:

an outer stator ring channel-shaped in cross-section and comprising a bottom portion and a pair of L-shaped side portions extending radially from the upper surface thereof;

a plurality of radially-extending stator vanes having leading and trailing edges integral with prolongations thereof, the outer ends of said vanes piercing the bottom portion of said outer stator ring when assembled therewith, said leading and trailing edges being rigidly affixed to the side portions of the ring co-extensively of the radial lengths thereof;

a plurality of discrete locating surfaces on the outer stator ring and vane assembly;

a plurality of locating surfaces on the inside of the casing, said surfaces comprising at least two rows of circumferentially-spaced discrete pads, the surfaces of each row of pads being arcuate in cross section and arranged on a single diameter, the discrete locating surfaces of said outer stator ring and vane end assembly abutting said casing pads;

a rotor shroud ring adjacent said outer stator ring;

mounting means on the outer surface of said shroud ring;

fastening means rigidly interconnecting said discrete casing pads, said L-shaped side portions, said vane edge prolongations, and said rotor shroud ring mounting means;

and an inner channel-shaped stator ring having radially inwardly-directed side portions and a connecting top portion, the inner ends of said stator vanes piercing said top portion when assembled therewith, said leading and trailing edges being rigidly affixed to the inner stator ring side portions co-extensively of the radial lengths thereof, the stator rings and vanes providing rigidity and roundness for the thin-walled, sheet-metal outer casing.

4. In an axial-flow turbomachine having a thin-walled, sheet-metal outer casing and at least one rotor stage, a stator assembly comprising:

an outer stator ring channel-shaped in cross-section and including radially outwardly-extending side portions and a connecting bottom portion;

a plurality of radially-extending stator vanes piercing the bottom portion of said stator ring and having leading and trailing edges;

a prolongation of at least one of said edges of at least some of said vanes, said prolongation and said leading and trailing edges of said vanes being rigidly affixed to respective side portions of the stator ring co-extensively of the radial lengths thereof;

a discrete locating surface on at least one surface of each of said prolongations;

locating and supporting means on said casing;

fastening means rigidly interconnecting said vane prolongations with said casing locating and supporting means when in abutment;

and an inner channel-shaped stator ring having radially inwardly-directed side portions and a connecting top portion, the inner ends of said stator vanes piercing said top portion when assembled therewith, said leading and trailing edges being rigidly affixed to the inner stator ring side portions co-extensively of the radial lengths thereof, the stator ring and vane assembly providing rigidity and roundness for the thin-walled, sheet-metal outer casing.

5. In an axial-flow turbomachine having a thin-walled, sheet-metal outer casing and at least one rotor stage, a stator assembly comprising:

an outer channel-shaped stator ring comprising a bottom portion and a pair of L-shaped side portions extending radially from the upper surface thereof;

a plurality of discrete locating surfaces on said L-shaped side portions;

a plurality of radially-extending stator vanes having leading and trailing edges integral with prolongations thereof, the outer ends of said vanes piercing the bottom portion of said outer stator ring when assembled therewith, said leading and trailing edges being rigidly affixed to the side portions of the ring co-extensively of the radial lengths thereof, said prolongations overlying the upper surfaces of said L-shaped side portions;

a plurality of discrete locating surfaces on outer portions of said prolongations;

a plurality of locating surfaces on the inside of the casing, said surfaces comprising at least two rows of circumferentially-spaced discrete pads, the surfaces of each row of pads being arcuate in cross-section and arranged on a single diameter, the discrete locating surfaces of said prolongations abutting said casing pads;

a rotor shroud ring adjacent said outer stator ring;

a mounting flange attached to said shroud ring;

fastening means extending through the locating surfaces of the casing, the vane prolongations, the L-shaped side portions, and the mounting flange, respectively, said fastening means rigidly securing said vanes and said outer stator ring to said casing and said mounting flange to said ring;

and an inner channel-shaped stator ring having radially inwardly-directed side portions and a connecting top portion, the inner ends of said stator vanes piercing said top portion when assembled therewith, said leading and trailing edges being rigidly affixed to the inner stator ring side portions co-extensively of the radial lengths thereof, the stator ring and vane assembly providing rigidity and roundness for the thin-walled, sheet-metal outer casing.

6. In an axial-flow turbomachine having a thin-walled, sheet-metal outer casing and at least one rotor stage, a stator assembly comprising:

an outer stator ring channel-shaped in cross-section and comprising a bottom portion and a pair of L-shaped side portions extending radially from the upper surface thereof;

a plurality of discrete locating surfaces on the inner surfaces of said L-shaped side portions;

a plurality of radially-extending stator vanes having leading and trailing edges integral with prolongations thereof, the outer ends of said vanes piercing the bottom portion of said outer stator ring when assembled therewith, said leading and trailing edges being rigidly affixed to the side portions of the ring co-extensively of the radial lengths thereof;

a plurality of discrete locating surfaces on outer portions of said prolongations;

a plurality of locating surfaces on the inside of the casing, said surfaces comprising at least two rows of circumferentially-spaced discrete pads, the surfaces of each row of pads being arcuate in cross section and arranged on a single diameter, the discrete locating surfaces of said prolongations abutting said casing pads;

a rotor shroud ring adjacent said outer stator ring;

a mounting flange attached to said shroud ring;

a plurality of locating surfaces on said mounting means in abutment with the locating surfaces on said L-shaped side portions;

fastening means extending through the locating surfaces on said casing, said vane prolongations, said L-shaped side portions and said mounting means, respectively, for rigid interconnection thereof;

and an inner channel-shaped stator ring having radially inwardly-directed side portions and a connecting top portion, the inner ends of said stator vanes piercing said top portion when assembled therewith, said leading and trailing edges being rigidly affixed to the inner stator ring side portions co-extensively of the radial length thereof, the stator ring and vane assembly providing rigidity and roundness for the thin-walled, sheet-metal outer casing.

7. The stator assembly as claimed in claim 5 wherein the outer and inner channel-shaped stator rings and the rotor shroud ring are constructed of thin-walled, sheet-metal, and the locating surfaces on the casing and the L-shaped side portions are formed from substantially circular metal buttons permanently affixed to the surfaces of said sheet metal parts in a predetermined location.

8. In an axial-flow turbomachine having a thin-walled, sheet-metal outer casing and at least one rotor stage, a stator assembly comprising:

an outer stator ring channel-shaped in cross-section and including radially outwardly-extending side portions and a connecting bottom portion;

an axially-extending cylindrical flange on each of said side portions at the outer extremities thereof, said flanges being directed outwardly of the outer channel-shaped stator ring;

a plurality of discrete locating surfaces on the inner surfaces of at least one of said cylindrical flanges;

a plurality of radially-extending stator vanes having leading and trailing edges integral with prolongations thereof, the outer ends of said vanes projecting through the bottom portion of said outer stator ring when assembled therewith, said leading and trailing edges being rigidly affixed to the side portions of the ring co-extensively of the radial lengths thereof, said prolongations overlying the outer surfaces of said cylindrical flanges;

a plurality of discrete locating surfaces on outer portions of said prolongations;

a plurality of locating surfaces on the inside of the casing, said surfaces comprising at least two rows of circumferentially-spaced discrete pads, the surfaces of each row of pads being arcuate in cross section and arranged on a single diameter, the discrete locating surfaces of said prolongations abutting said casing pads;

fastening means extending through the locating surfaces of the casing, the vane prolongations and the cylindrical flanges, respectively, said fastening means rigidly securing said vanes and said outer stator ring to said casing;

a rotor shroud ring adjacent said outer stator ring;

a mounting flange attached to said shroud ring;

a plurality of locating surfaces on said mounting flange, said locating surfaces abutting the locating surfaces on said one of said cylindrical flanges, the mounting flange being secured thereto by said fastening means, said shroud ring and said outer stator ring bottom portion forming the outer flow-path in said turbomachine;

and an inner channel-shaped stator ring having radially inwardly-directed side portions and a connecting top portion, the inner ends of said stator vanes projecting through said top portion when assembled therewith, said leading and trailing edges being rigidly affixed to the inner stator ring side portions co-extensively of the radial lengths thereof, whereby said stator ring and vane assembly provides rigidity and roundness for the thin, sheet-metal outer casing.

References Cited by the Examiner

UNITED STATES PATENTS

| | | | |
|---|---|---|---|
| 1,820,069 | 8/1931 | Herr | 29—156.4 |
| 2,623,728 | 12/1952 | Feilden et al. | 253—78 |
| 2,843,357 | 7/1958 | Spindler | 253—78 |
| 2,885,768 | 5/1959 | Shinn | 29—156.4 |
| 2,903,237 | 9/1959 | Petrie et al. | 253—78 |
| 2,959,394 | 11/1960 | Halford et al. | 253—78 |
| 2,994,508 | 8/1961 | Howald | 253—78 |
| 3,067,983 | 12/1962 | Koziura | 253—78 |

MARTIN P. SCHWADRON, *Primary Examiner.*

BENJAMIN A. BORCHELT, *Examiner.*

S. W. ENGLE, *Assistant Examiner.*